June 30, 1959  A. W. VASEL  2,892,971
RADIATION-RESPONSIVE CONTROL CIRCUITS
Filed July 12, 1954

INVENTOR
ALFRED W. VASEL
BY Jean C. Chognard
ATTORNEY

United States Patent Office 2,892,971
Patented June 30, 1959

2,892,971

RADIATION-RESPONSIVE CONTROL CIRCUITS

Alfred W. Vasel, Brockton, Mass., assignor to Electronics Corporation of America, a corporation of Massachusetts Application July 12, 1954, Serial No. 442,466

6 Claims. (Cl. 317—130)

The present invention relates to control circuits comprising a radiation-responsive element such as a photoelectric cell. Such circuits are used to perform a wide variety of control functions in response to light or radiation changes.

In some instances it is highly desirable to have a radiation responsive control circuit having a very low standby current consumption. This is the case where the power supply for the circuit is a small storage battery or dry cell.

One of the objects of the present invention is therefore to provide a radiation-responsive control circuit having a very low stand-by current consumption.

There are also instances where it is highly desirable to have a radiation-responsive control circuit in which no vacuum tubes are used. Vacuum tubes are usually fragile, and their life is relatively short.

Another object of this invention is therefore to provide a radiation-responsive control circuit in which no vacuum tubes are used. Radiation-responsive control circuits are designed to produce an electrical change in response to light or radiation changes. This electrical change is in turn used to perform an operation such as the opening of a door, the triggering of an intrusion alarm, etc. For purposes of illustration, the radiation sensitive control circuit of the present invention will be described in connection with two different applications: first, in connection with an explosion detection and suppression system; and second, in connection with an intrusion alarm.

An explosion-detection system has been proposed in which a radiation-sensitive control circuit detects the rise in radiant energy found in incipient explosions. Whereas this rise is extremely fast in explosions of substances that carry their own oxygen, in explosions of mixtures of fuels and air it is slow enough to be detected by photoelectric means. The photoelectric explosion detector operates an explosion suppressor. This suppressor comprises a frangible container for an extinguishing agent. A fast-acting detonator is actuated by the explosion detector to burst the suppressor and scatter the extinguishing agent. This arrangement is described in co-pending United States patent application Serial No. 364,142, filed June 25, 1953, by Bradford T. Joyce and Albert F. Krueger, and entitled "Explosion Detection and Suppression," now issued as U.S. Patent No. 2,799,781.

The first application in connection with which the photoelectric control circuit of the present invention will be described is the protection of large fuel-storage tanks against explosions. These tanks are often in a location remote from power lines which may fail when subjected to aerial bombardment. It is therefore desirable to use explosion detection and suppression systems which are wholly self-contained and which do not rely on outside sources of power. The control circuit in accordance with the present invention may be energized by means of a dry cell and has such a low stand-by current consumption that it may detect explosions without interruption for over a year without the necessity of changing the dry cell. The absence of vacuum tubes and the long life of all components of the circuit render unnecessary inspections occurring more often than those needed to change the battery.

The second application in connection with which the circuit in accordance with this invention will be described is an intrusion alarm. Whereas in the explosion detector above, the circuit responds to an increase in radiation, the intrusion alarm responds to a decrease in radiation, i.e. to the cutting off of a light beam, and the control circuit is modified accordingly.

In accordance with the present invention, a pulse developed across a radiation-sensitive device is applied to a unilateral conduction device in series with a gas-discharge tube. The polarity of this device is such that it offers a high-impedance path to this pulse. The potential developed by this pulse across this device is used to trigger the gas-discharge tube. Once the tube is ignited, the unilateral conduction device offers a low-impedance path to the flow of current through the tube. An output device, such as a relay, responds to this current flow.

Other and incidental objects of the present invention will be apparent to those skilled in the art from a reading of this specification and an inspection of the accompanying drawing in which.

Figure 1:
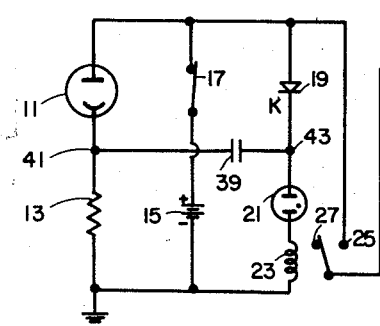
Figure 1 shows a photoelectric control circuit in accordance with this invention used in an explosion detector and suppressor system.

The photoelectric control circuit shown in Figure 1 comprises a photoelectric cell 11 connected in series with a resistor 13. The cell 11 and resistor 13 are connected across a power source which is shown as a battery 15. A switch 17 is provided to connect and disconnect the battery. Also connected across battery 15 are a series circuit comprising a unilateral conduction device 19, a gas discharge tube 21 and a relay coil 23. The unilateral conduction device 19 may be a crystal diode, and its polarity is such that it offers its low impedance to the flow of current from battery 15 through circuit elements 19, 21 and 23. The gas discharge tube 21 may be a neon bulb. Also connected across the battery 15 are normally open contacts 25 and 27 operated by relay coil 23, and the suppressor 29. The suppressor 29 may be of a type comprising a relatively stiff backing plate 31 which includes a housing for a detonator 33. A frangible cup 35 is securely attached to the backing plate 31 and forms a sealed cavity in which the extinguishing agent 37 is placed. Provisions are made for filling and mounting the suppressor. These construction details are illustrated in British Patent No. 643,188, published September 15, 1950. A capacitor 39 connects the junction 41 of cell 11 and resistor 13 to the junction 43 of diode 19 and neon bulb 21.

The operation of the circuit of Figure 1 is as follows: the dark resistance of the photocell 11 and the resistance of resistor 13 are about equal, so that under normal conditions the potential at junction 41 is about half of that at the positive terminal of battery 15. The battery voltage and the resistance of diode 19 and coil 23 are so chosen that the potential across the neon bulb 21 is below its ignition potential but above its regulating potential. Upon a sudden rise of radiant energy impinging upon photocell 11, the resistance of photocell 11 is lowered considerably, and the voltage at point 41 rises suddenly in a positive direction. This positive voltage pulse is applied to junction 43 by means of capacitor 39. As diode 19 is of such polarity that it offers a high resistance to this voltage pulse, the rise in potential at junction 43 is sufficient to ignite the neon bulb 21. Once the neon bulb 21 is ignited, it keeps conducting as the steady potential across it is above its regulating potential. Current thus flows through the relay coil 23 closing contacts 25 and 27. This fires the detonator 33 and operates the suppressor 29.

The photocell 11 may be a lead sulfide photoconductive cell and may have a resistance of the order of one or two megohms. Until an explosion is detected, the only current drain on the battery 15 is that through the series circuit including the cell 11 and the resistor 13, i.e. through a combined resistance of two to four megohms. Such a low-current drain does not alter appreciably the normal shelf life of battery 15.

Figure 2:
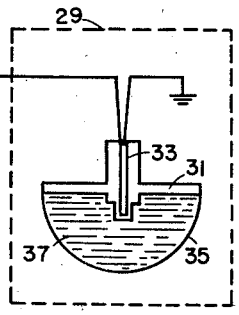
Figure 2 shows a fuel-storage tank equipped with the explosion detector and suppressor system of Figure 1.
Figure 2:
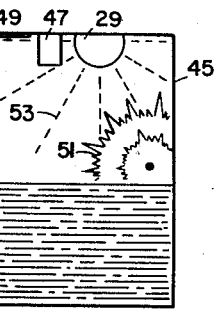

Figure 2 shows how the arrangement shown in Fig. 1 may be installed to protect a large fuel tank 45. The photoelectric control circuit is shown at 47, and the suppressor 29 may be mounted at the top of the tank 45. If the tank 45 is provided with a trap door 49, this trap door should operate the switch 17 in order to disconnect battery 15 from the circuit upon opening the door 49. Failure to do so may cause the sudden admission of daylight upon opening the door 49 to operate the detector and fire the suppressor 29. Upon the occurrence of an explosion, the detector 47 detects the flame front 51 and fires the suppressor 29, scattering the extinguishing agent as shown schematically by means of broken lines 53.

Figure 3:
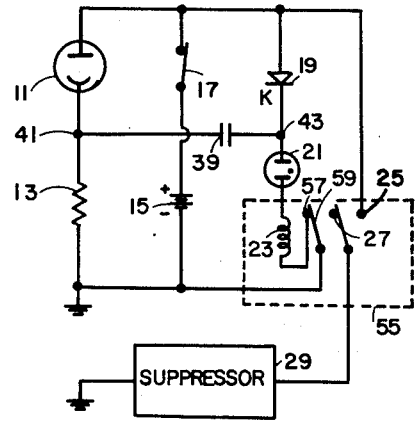
Figures 3 and 4 show modifications of the circuit of Figure 1 by means of which the photoelectric control circuit is automatically reset.

The circuit of Figure 3 is similar to that of Figure 2 except that it comprises a self-interrupting relay 55. In the circuit of Figure 1 the neon bulb 21 keeps conducting once it is triggered off by a pulse. In the circuit of Figure 3 the self-interrupting relay 55 opens normally-closed contacts 57 and 59 and closes normally-open contacts 25 and 27 in response to the flow of current through relay coil 23. The opening of contacts 57 and 59 interrupts this flow of current, and the neon bulb is extinguished and ready to fire again upon the occurrence of another pulse. The interruption of current through relay coil 23 brings the contacts back to their normal positions as shown in Figure 3. This circuit is useful where the suppressor 29 comprises a plurality of individual suppressors which may be operated successively upon the occurrence of successive explosions, and in any application where a control circuit which resets itself automatically is desirable.

Figure 4:
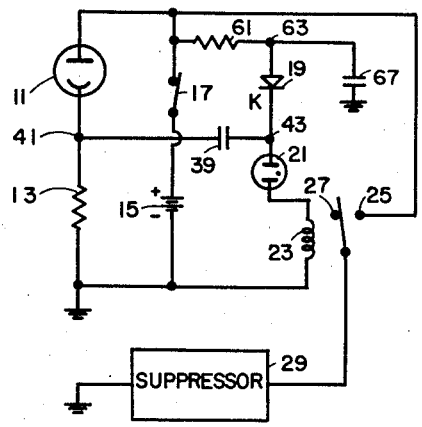

The circuit of Figure 4 has the same object as that of Figure 3, i.e. it is automatically reset after the occurrence of a pulse. The anode of diode 19 is connected to the positive terminal of battery 15 through a resistor 61, and the junction 63 of diode 19 and resistor 61 is connected to ground through a capacitor 67. When the occurrence of a positive pulse fires the neon bulb 21, capacitor 67 discharges through diode 19 and neon bulb 21. The discharge of capacitor 67 lowers the voltage at point 63 and extinguishes the neon bulb 21 which cannot be fired again until capacitor 67 is charged through resistor 61.

Figure 5:
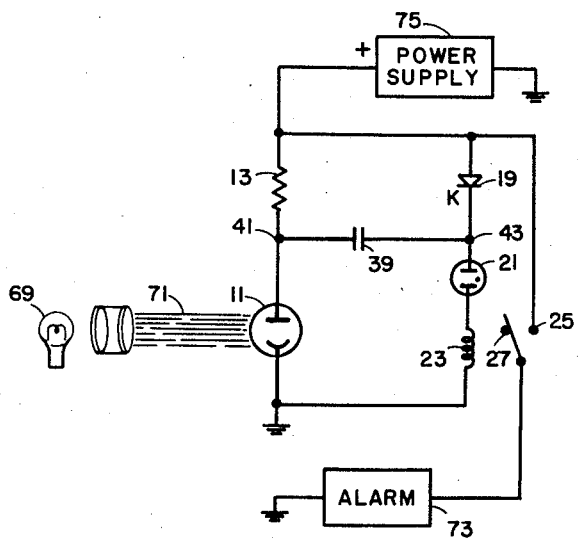
Figure 5 shows an intrusion alarm using a modification of the circuit of Figure 1.

The circuit of Figure 5 shows a modification of the circuit of Figure 1 for use in an intrusion alarm. The position of the photocell 11 and the resistor 13 are reversed. A light source 69 throws a beam of light 71 upon the photocell 11. When this beam of light is interrupted by the passage of an intruder, the resistance of photocell 11 goes up, and a positive pulse is coupled over capacitor 39 to junctions 43. The neon bulb 21 fires, and the flow of current through relay coil 23 closes contacts 25 and 27. The closing of contacts 25 and 27 operates the alarm 73. In the circuit of Figure 5, the battery 15 has been replaced by a power supply 75.

It is to be noted that the pulse at junction 41 is differentiated by the network comprising capacitor 39 and the high or back resistance of diode 19. The values of these elements determine how steep a pulse need be to raise the voltage across neon bulb 21 sufficiently to fire it.

I claim:

1. A radiation-sensitive control circuit comprising a unilateral conduction device, a gas-discharge tube, means to connect said unilateral conduction device and said gas discharge tube to form a series circuit, power supply means to apply across said series circuit a voltage having such polarity that current may flow through said unilateral conduction device and such magnitude that the voltage across said gas-discharge tube is below the firing voltage of said tube, radiation-sensitive means including a photoelectric cell and a resistor connected in series across said power supply means to derive an electrical pulse in response to a radiation change, means to apply said pulse to the junction of said unilateral conduction device and said gas-discharge tube with such polarity that said pulse increases the voltage across said gas-discharge tube, and output means responsive to current flow through said gas-discharge tube.

2. A radiation-sensitive control circuit comprising a unilateral conduction device, a gas-discharge tube, means to connect said unilateral conduction device and said gas-discharge tube to form a series circuit, power supply means to apply across said series circuit a voltage having such polarity that current may flow through said unilateral conduction device and such magnitude that the voltage across said gas-discharge tube is between the firing and regulating voltages of said tube, radiation-photosensitive means including a photoelectric cell and a resistor connected in series across said power supply means to derive an electrical pulse in response to a radiation change, means to apply said pulse to the junction of said unilateral conduction device and said gas-discharge tube with such polarity that said pulse increases the voltage across said gas-discharge tube, and output means responsive to current flow through said gas-discharge tube.

3. A radiation-sensitive control circuit comprising a unilateral conduction device, a gas-discharge tube, means to connect said unilateral conduction device and said gas-discharge tube to form a series circuit, power supply means to apply across said series circuit a voltage having such polarity that current may flow through said unilateral conduction devices and such magnitude that the voltage across said gas-discharge tube is below the firing voltage of said tube, radiation-sensitive means including a photoelectric cell and a resistor connected in series across said power supply means to derive an electrical pulse in response to a radiation change, means to apply said pulse to the junction of said unilateral conduction device and said gas-discharge tube with such polarity as to oppose conduction through said unilateral conduction device, and output means responsive to current flow through said gas-discharge tube.

4. A radiation-sensitive control circuit comprising a unilateral conduction device, a gas-discharge tube, means to connect said unilateral conduction device and said gas-discharge tube to form a series circuit, a capacitor connected in parallel with said series circuit, power supply means including a series resistor to apply across said series circuit a voltage having such polarity that current may flow through said unilateral conduction device and such magnitude that the voltage across said gas-discharge tube is below the firing voltage of said tube, radiation-sensitive means including a photoelectric cell and a resistor connected in series across said power supply means to derive an electrical pulse in response to a radiation change, means to apply said pulse to the junction of said unilateral conduction device and said gas-discharge tube with such polarity that said pulse increases the voltage across said gas-discharge tube beyond the firing voltage of this tube, and output means responsive to current flow through said gas-discharge tube.

5. A radiation-sensitive control circuit comprising a unilateral conduction device, a gas-discharge tube, means to connect said unilateral conduction device and said gas-discharge tube to form a series circuit, power-supply means to apply across said series circuit a voltage having such polarity that current may flow through said unilateral conduction device and such magnitude that the voltage across said gas-discharge tube is below the firing voltage of said tube, radiation-sensitive means including a photoelectric cell and a resistor connected in series across said power-supply means to derive an electrical pulse in response to a radiation change, means including a capacitor to apply said pulse to the junction of said unilateral conduction device and said gas-discharge tube with such polarity that said pulse increases the voltage across said gas-discharge tube, and output means responsive to current flow through said gas-discharge tube.

6. A radiation-sensitive control circuit according to claim 5 wherein said output means comprise a self-interrupting relay.

References Cited in the file of this patent

UNITED STATES PATENTS

| | | |
|---|---|---|
| 1,930,829 | Steenbeck | Oct. 17, 1933 |
| 2,096,916 | Pook | Oct. 26, 1937 |
| 2,386,320 | Kott | Oct. 9, 1945 |
| 2,432,084 | Blair | Dec. 9, 1947 |
| 2,570,442 | Grosdoff | Oct. 9, 1951 |

OTHER REFERENCES

"Photoelectric Relays Use Cold-Cathode Tubes," Radio Electronics, April 1950, pp. 34–36.